(No Model.)
J. G. HODGSON.
SOLDERING MACHINE.
No. 408,238. Patented Aug. 6, 1889.
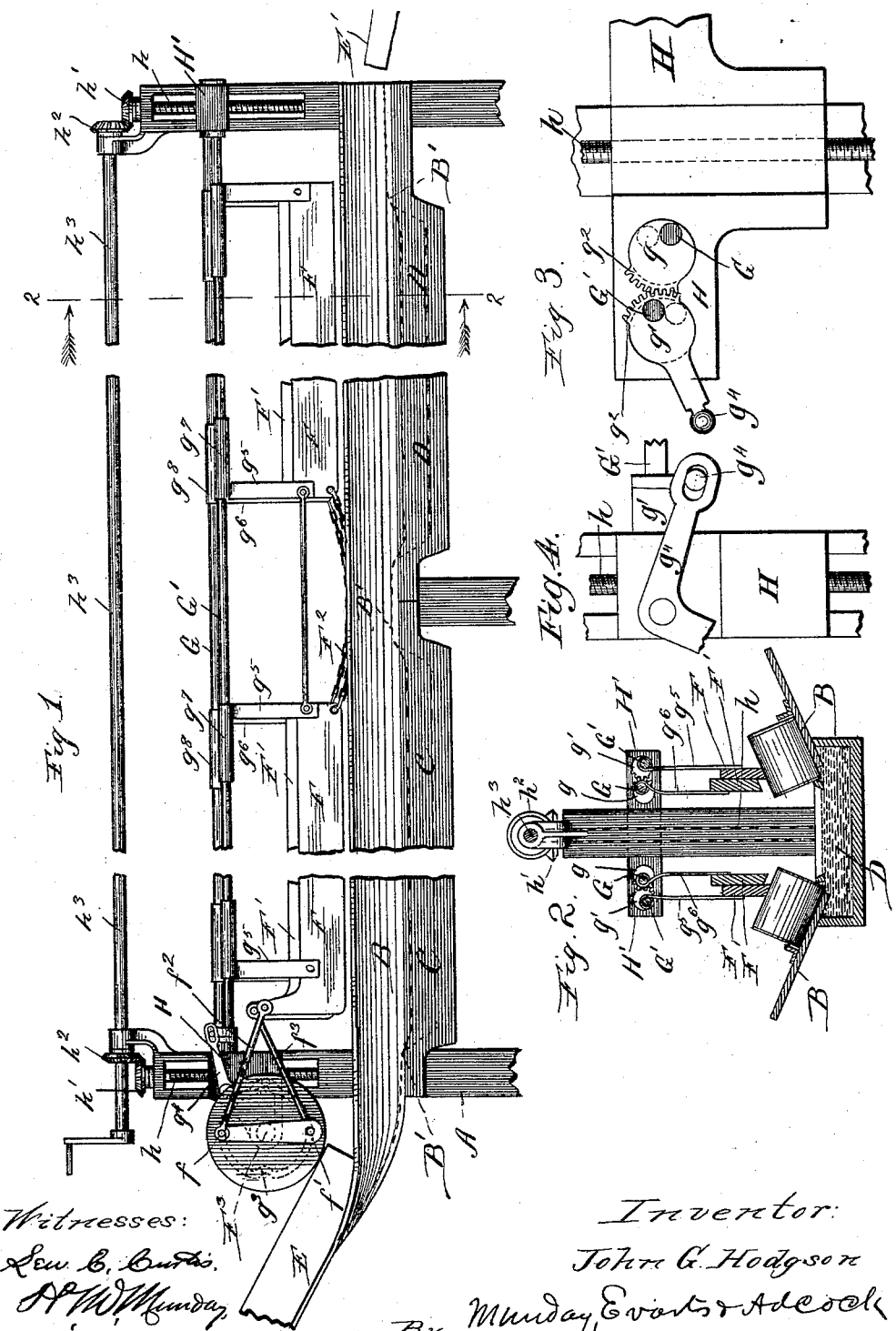
Witnesses:
Geo. E. Curtis.
H. W. Munday.
Inventor:
John G. Hodgson
By Munday, Evarts & Adcock
his Attorneys.

UNITED STATES PATENT OFFICE.

JOHN G. HODGSON, OF MAYWOOD, ILLINOIS, ASSIGNOR TO EDWIN NORTON, OF SAME PLACE, AND OLIVER W. NORTON, OF CHICAGO, ILLINOIS.

SOLDERING-MACHINE.

SPECIFICATION forming part of Letters Patent No. 408,238, dated August 6, 1889.

Application filed October 15, 1888. Serial No. 288,061. (No model.)

*To all whom it may concern:*

Be it known that I, JOHN G. HODGSON, a citizen of the United States, residing in Maywood, in the county of Cook and State of Illinois, have invented a new and useful Improvement in Soldering-Machines, of which the following is a specification.

My invention relates to machines for soldering the end seams of sheet-metal cans.

My invention consists, in connection with the solder bath and an inclined track for supporting the cans as they are rolled through the bath, of a pair of longitudinally-reciprocating bars or devices for rolling the cans along said track, the bars being alternately raised out of contact with the cans as each makes its backward stroke. I employ two reciprocating bars or devices, so that one may be rolling the cans while the other is returning, and the cans be thus kept continuously in motion. Any suitable mechanism may be employed for imparting to the bars or devices their rising and falling and reciprocating movements. The reciprocating can-rolling devices may consist of simple bars of wood or other material; or they may consist of a flexible chain, rope, or belt supported at each end. By making the reciprocating can-rolling device flexible—like a chain, for example—it will allow the can to pass over conveniently the inclined portions of the track upon which it rolls.

In the accompanying drawings, which form a part of this specification, and in which similar letters of reference indicate like parts, Figure 1 is a side view of a machine embodying my invention. Fig. 2 is a cross-section on line 2 2 of Fig. 1, and Fig. 3 is a detail end view of the mechanism for raising the reciprocating can-rolling devices or bars. Fig. 4 is a detail side elevation showing the bent lever for actuating the eccentrics, by the rotation of which the bars for supporting the can-rolling devices are raised and lowered.

In said drawings, A represents the frame of the machine.

B is the track along which the can is rolled through the fluxing-bath C and solder bath D. The inclined track B has raised portions B' where it descends into and rises out of the baths.

E is the chute by which the cans are delivered into the machine, and E' the discharge-chute.

F F' are the reciprocating devices by which the cans are rolled along the track B. As shown in the drawings, the end portion of each reciprocating can-rolling device consists of a simple bar of wood or metal, and the middle portion consists of a flexible chain supported at each end. The can-rolling devices F F' are reciprocated by cranks $f\ f'$ on the driving-shaft $F^3$, which are connected to the devices F F' by the pivoted links $f^2\ f^3$. The can-rolling devices F F' are alternately raised out of contact with the cans on the track B by the vertically-moving supporting-bars G G', which are mounted in the eccentric sleeves $g\ g'$, which are journaled in the slides H H'. The sleeve $g'$ is rocked or oscillated by a cam $g^3$, which engages an arm or lever $g^4$, connected to the end $g^5$ of the rocking sleeve. The intermediate flexible portion $F^2$ of the reciprocating can-rolling devices F F' permits the cans to pass over the elevated portions B' of the track B. The sleeves $g\ g'$ have intermeshing segment gear-teeth $g^2\ g^2$.

The supporting-bars G G' are furnished at each end with similar eccentric sleeves $g\ g'$, having intermeshing gear-teeth $g^2\ g^3$. In Fig. 3 the geared eccentric sleeves at the can delivery or receiving end of the machine are shown, and in Fig. 2 the similar eccentric geared sleeves at the opposite end of the machine are indicated.

The can-rolling devices F F' are connected to their supporting-bars G G' by straps $g^5\ g^6$, having sleeves $g^7\ g^8$, which slide on the bars G G'.

The mechanism for reciprocating and the mechanism for moving up and down the can-rolling devices F F' are mounted upon adjustble slides H H' at each end of the machine, so that the can-rolling devices F F' may be adjusted up and down to accommodate cans of different diameters.

The adjustment of the slides H H' is effected by adjusting-screws $h\ h$, threaded in said slides or in nuts secured thereto, having bevel-gears $h'\ h'$, which mesh with bevel-gears $h^2\ h^2$ on the crank-shaft $h^3$.

I claim—

1. In a can-end-soldering machine, the combination, with a solder bath and a track for supporting the cans as they roll through the same, of a pair of alternately rising and falling reciprocating devices for rolling the cans along said track, said can-rolling devices operating alternately upon the cans, so that the cans are rolled continuously through the bath of solder, substantially as specified.

2. The combination, with a track, of a pair of alternately reciprocating can-rolling devices, means for reciprocating said devices, and means for moving said devices out of contact with the cans as they make their backward movement, whereby the cans are rolled continuously, substantially as specified.

3. The combination, with a track having a raised portion, of a reciprocating can-rolling device having a flexible portion to permit the cans to pass over the raised portion of the track, and means for raising and lowering said can-rolling device, substantially as specified.

4. The combination, with a flux bath, a solder bath, and a can-rolling track, of a pair of rising and falling bodily-reciprocating can-rolling devices, means for reciprocating said devices, and means for alternately moving them out of contact with the cans as each makes its backward movement, said can-rolling devices operating alternately upon the cans, so that the cans are rolled continuously through said solder bath, substantially as specified.

5. The combination, with a track, of a rising and falling bodily-reciprocating flexible can-rolling device, substantially as specified.

6. The combination of a solder bath, a track, and a pair of alternately rising and falling reciprocating flexible can-rolling devices, substantially as specified.

7. The combination, with a solder bath, of a track, a rising and falling reciprocating can-rolling device, means for reciprocating said can-rolling device in a rectilinear path in contact with the cans, and means for raising and lowering it, whereby said can-rolling device is given a four-motion movement, substantially as specified.

JOHN G. HODGSON.

Witnesses:
H. M. MUNDAY,
EDMUND ADCOCK.